UNITED STATES PATENT OFFICE.

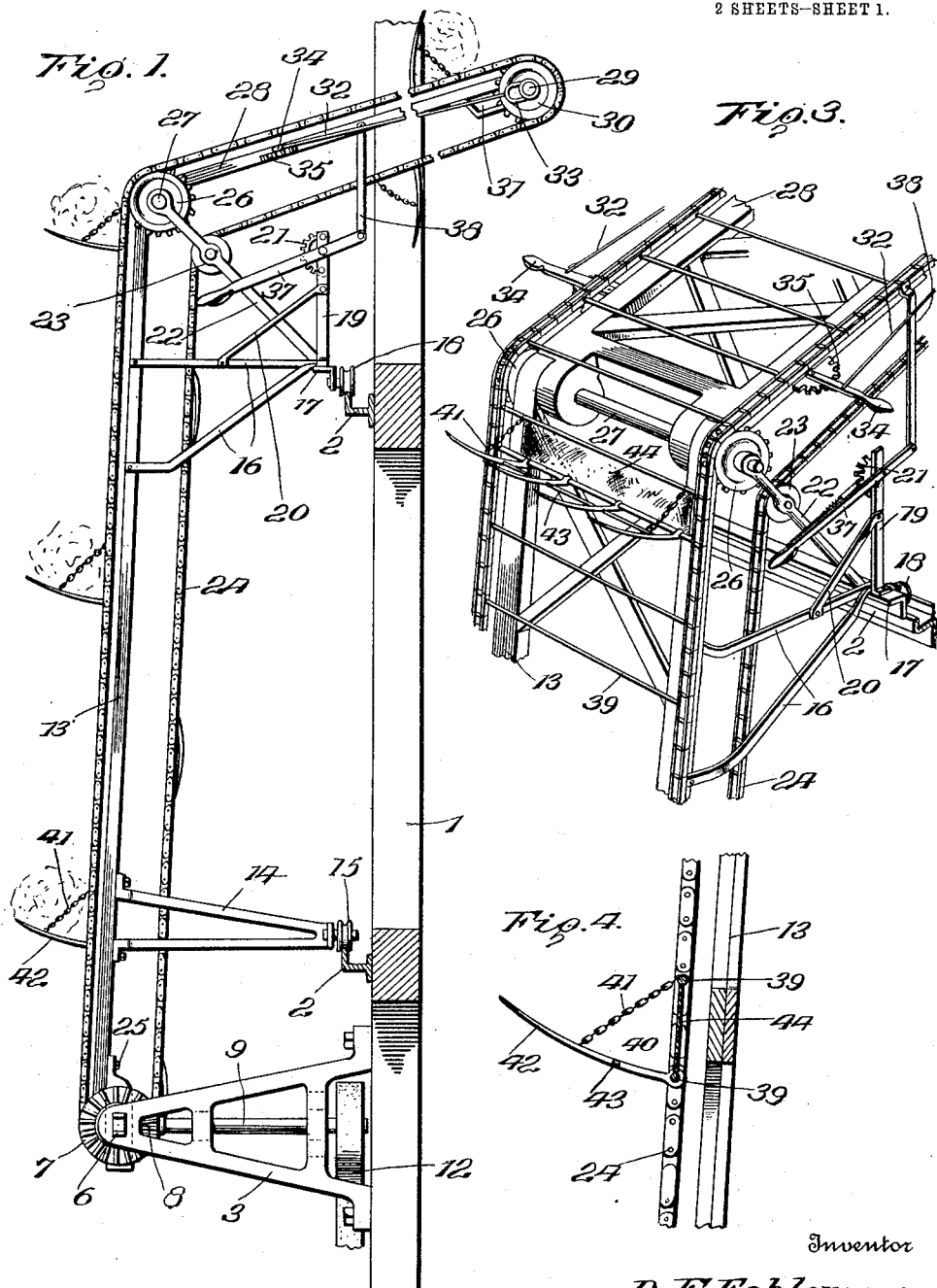

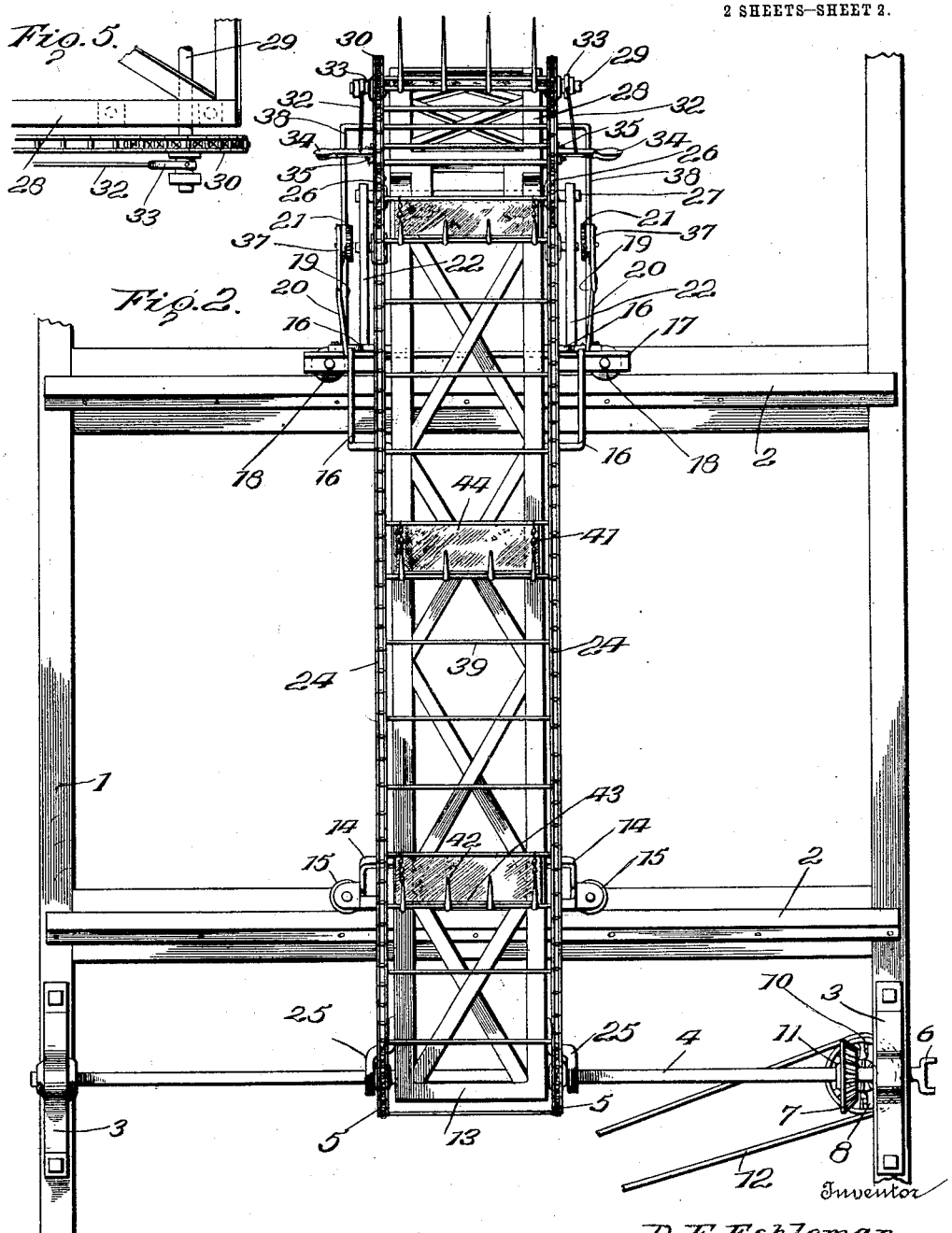

DAVID F. ESHLEMAN, OF MARION, PENNSYLVANIA.

HAY OR GRAIN ELEVATOR AND DISTRIBUTER.

1,109,408. Specification of Letters Patent. Patented Sept. 1, 1914.

Application filed January 23, 1913. Serial No. 743,861.

*To all whom it may concern:*

Be it known that I, DAVID F. ESHLEMAN, a citizen of the United States, residing at Marion, in the county of Franklin and State of Pennsylvania, have invented certain new and useful Improvements in Hay or Grain Elevators and Distributers, of which the following is a specification.

This invention relates to means for delivering hay or grain from a stack or wagon into a barn or warehouse, and has for its object the provision of an apparatus which will be efficient in use and may be easily operated so as to distribute the hay or grain evenly in the place where it is to be stored.

A further object of the invention is to provide means whereby the elevator and distributer may be easily shifted so as to deliver the grain or hay at different points within the warehouse or barn without requiring any stoppage of the operating mechanism or disconnecting the same from the elevator.

A still further object of the invention is to provide novel carriers or supports for the hay or grain.

The invention seeks also to improve, generally, the construction and arrangement of the parts of a hay elevator and distributer to the end that highly efficient apparatus may be produced at a cost which is not prohibitive.

The several objects of the invention are accomplished in apparatus of the type illustrated in the accompanying drawings, and the invention resides in certain novel features which will be first fully described and then more particularly pointed out in the claims following the description.

In the drawings: Figure 1 is a view partly in side elevation and partly in section of an apparatus embodying my invention, showing the same applied to the side of a barn or warehouse; Fig. 2 is a front elevation of the same; Fig. 3 is a detail perspective view of the upper portion of the elevator and distributer belt and its support; Fig. 4 is a detail sectional view of one of the shelves or carriers; Fig. 5 is a detail plan view of a portion of the upper frame.

My improved elevator and distributer may be mounted on any convenient supporting frame, but is illustrated as applied to the side of a barn or warehouse, indicated at 1, and adapted to travel upon upper and lower tracks 2 secured to the beams of the building. Suitable bearing brackets 3 are secured to the building below the lower track, and in these brackets is journaled a shaft 4 which has cylindrical ends to facilitate its rotation in its bearings but is of angular cross sectional form throughout the greater portion of its length so that sprocket wheels 5 fitted to said shaft may be rotated thereby, while permitted to slide therealong. The end of this shaft is formed into a yoke 6 to facilitate its connection with the shaft of a horse power and it is also equipped with a beveled gear wheel 7 adapted to mesh with a similar gear wheel 8 on the end of a shaft 9 which is journaled in suitable bearings 10 on one of the brackets 3. A band pulley 11 is fitted on this shaft 9 and receives power from a belt 12, so that the apparatus may be operated from an engine or other convenient prime motor.

A rigid frame 13 is slidably mounted at its lower end on the shaft 4 between the sprockets 5 and to said frame, I secure the rearwardly projecting brackets 14 having grooved rollers 15 mounted on their rear ends to engage and ride upon the lower track 2, as shown clearly in Fig. 1, and rearwardly extending arms 16 are secured to the said frame near the upper end thereof, the rear ends of said arms being secured to a connecting trolley bar 17 carrying rollers 18 arranged to run on the upper track 2. From the trolley bar 17 rise standards 19 connected to the upper arms 16 by braces 20 and carrying notched segments or holding racks 21 at their upper ends, as shown. Inclined posts or supports 22 also rise from the trolley bar. Idlers 23 are mounted on these posts 22 to guide the sprocket chains 24 on their return run, said sprocket chains being actuated by the sprocket wheels 5, as will be readily understood on reference to Fig. 2. The said sprocket wheels 5 are held in the proper spaced relation and prevented from moving laterally away from the conveyer by arms or brackets 25 secured to the frame near the lower end thereof.

Idler sprockets 26 are fitted upon a rod or shaft 27 which is secured in and extends between the upper ends of the posts 22 and upon this rod or shaft is pivotally fitted a frame 28, said frame extending into the warehouse or barn above the hay or grain stored therein and being equipped, at its extremity, with bearings for a shaft 29 carrying idler sprockets 30 around which the sprocket chains 24 may run. The bearings 31 for the shaft 29 are elongated, as shown in Fig. 1, to permit sliding movement of the shaft 29 so that the shaft may be adjusted to maintain the chains in a sufficiently taut condition to insure their proper operation. Links 32 are arranged at the sides of the frame 28 and are connected through forks 33 with the shaft 29, the outer ends of the links being pivoted to levers 34 which are fulcrumed on the sides of the frame 28 and equipped with suitable latches to engage rigid segments 35 on the frame. It will be readily understood that by manipulating the levers 34 the shaft 29 and sprockets 30 may be adjusted to put the sprocket chains under proper tension.

At the upper ends of the standards 19 are fixed holding segments 21, as before stated, and fulcrumed on the standards, concentric with said segments, are levers 37 which are equipped with suitable latches to engage said segments. The levers extend rearwardly past the standards and their rear ends are connected, by upwardly extending links 38, with the frame 28 so that, by manipulating the said levers, the frame 28 may be set to deliver at a higher or lower point, as will be readily understood.

The sprocket chains 24 are disposed slightly beyond the side edges of the frames 13 and 28 and are connected at intervals by cross bars or rods 39.

Upon some of the rods are pivoted or hinged shelves or carriers 40, the ends of the said shelves or carriers being connected with the next rod above by chains or other flexible devices 41. These chains or flexible connections 41 are of such length that on the upward or outer run of the apron they will prevent the shelves or carriers dropping below the rods 40 to which they are respectively hinged and will support them at a slight upward inclination, as shown clearly in Fig. 1, so that a bundle placed upon the shelf will be firmly supported and will be caused to travel with the carrier to the extreme end of the plate or frame 28 where it will be discharged as the carrier or the shelf passes around the shaft 29. The shelves are preferably in the form of forks or fingers 42 connected by a rod 43, the fingers being somewhat curved so as to conform to the shape of the bundle and securely hold the same. A back plate or support 44 of canvas or other material is secured to the rods 39 of the shelves so as to prevent the bundles falling against or through the frame 13 and thereby clogging the operation of the machine.

It is thought the operation and advantages of the apparatus will be readily understood from the foregoing description, taken in connection with the accompanying drawings.

The bundles of hay or grain are placed upon the shelves and the sprocket chains are set in motion through the rotation of the main shaft 4. The bundles are thereby carried to the end of the frame 28 and will be discharged as the shelves pass around the shaft 29. As the grain or hay accumulates at one point in the barn or warehouse, the entire elevator is shifted along the angular shaft 4, the rollers 15 and 18 facilitating said travel, so that the bundles may be deposited at another point. Upon referring to Fig. 1, it will be noted that as the shelves pass along the return runs of the sprocket chains, they will swing close thereto and, consequently, will not swing against other parts and be thereby broken off or injured. The brackets or arms 14 are somewhat longer than the supporting arms 16 so that the upper portion of the elevator will set closer to the side of the building than the lower portion and an inclination thereby given the apparatus which will aid in preventing the bundles rolling off the shelves as they are being carried upward. The structure shown and described furnishes a very strong support for the upper portion of the elevator without making the same cumbersome or heavy, and the runs of the elevator are held away from the tracks so that they will offer no interference to the lateral shifting of the elevator. The rollers support the weight of the elevating apparatus so that the strain upon the driving mechanism is minimized and the weight of the elevator is taken therefrom.

What I claim is:—

1. The combination of a fixed support, a trolley mounted to travel on said support, a frame rigidly connected with said trolley and extending above the same, posts rising from the trolley and supporting the upper end of the frame, standards rising from the trolley, a laterally extending frame supported by the posts in pivotal relation to the upper end of the first-mentioned frame, devices mounted on the standards below the laterally extending frame and connected therewith for raising and lowering the same, a conveyer disposed to travel the length of both frames, and means for operating said elevator.

2. The combination of a track, a carriage mounted to travel on said track from end to end thereof and projecting forwardly therefrom, a frame secured to the front end of said carriage, a second frame disposed above and supported by the carriage and extending laterally from the upper end of the first-mentioned frame, an elevator extending around both frames, and means on the carriage below the laterally extending frame for raising and lowering the same.

3. The combination of a fixed support, upper and lower tracks on said support, carriages mounted to travel on said tracks and projecting forwardly therefrom, the lower carriage being longer than the upper carriage, a frame secured to the front ends of said carriages, a laterally extending frame supported by the upper carriage and having a hinged connection with the upper end of the first-mentioned frame, means on the upper carriage to raise and lower said laterally extending frame, an elevator extending around the two frames, and means for actuating said elevator.

4. The combination of an elevator frame, supporting arms secured to and extending rearwardly from said frame, a trolley secured to and extending between the rear ends of said arms, standards rising from the trolley, posts secured to and rising from the trolley, a laterally extending swinging frame supported by the upper ends of said posts, an elevator arranged to travel upon the elevator frame and said swinging frame, levers mounted on the said standards, and links connecting said levers with the swinging frame.

In testimony whereof I affix my signature in presence of two witnesses.

DAVID F. ESHLEMAN. [L. S.]

Witnesses:
C. M. ORR,
FRANK ORR.

Copies of this patent may be obtained for five cents each, by addressing the "Commissioner of Patents, Washington, D. C."